(12) United States Patent
Shah et al.

(10) Patent No.: US 9,887,637 B1
(45) Date of Patent: Feb. 6, 2018

(54) HIGH SPEED PROGRAMMABLE THRESHOLD GALLIUM NITRIDE POWER LIMITER

(71) Applicant: Tagore Technology, Inc., Arlington Heights, IL (US)

(72) Inventors: Manish N. Shah, Vernon Hills, IL (US); Sudhir Gouni, Wheeling, IL (US); Amitava Das, Barrington Hills, IL (US)

(73) Assignee: Tagore Technology, Inc., Arlington Heights, IL (US)

( * ) Notice: Subject to any disclaimer, the term of this patent is extended or adjusted under 35 U.S.C. 154(b) by 0 days.

(21) Appl. No.: 15/184,593

(22) Filed: Jun. 16, 2016

Related U.S. Application Data

(60) Provisional application No. 62/180,105, filed on Jun. 16, 2015, provisional application No. 62/180,130, filed on Jun. 16, 2015.

(51) Int. Cl.

| | |
|---|---|
| *G05F 1/00* | (2006.01) |
| *G05F 1/565* | (2006.01) |
| *G05F 1/573* | (2006.01) |
| *H02M 5/293* | (2006.01) |
| *H02M 1/08* | (2006.01) |

(52) U.S. Cl.
CPC ............. *H02M 5/293* (2013.01); *H02M 1/08* (2013.01); *H02M 2005/2932* (2013.01)

(58) Field of Classification Search
CPC .................................. G05F 1/56; G05F 1/569
USPC .................... 323/265, 266, 270, 274–277
See application file for complete search history.

(56) References Cited

U.S. PATENT DOCUMENTS

| | | | |
|---|---|---|---|
| 6,853,264 B2 | 2/2005 | Bennett et al. | |
| 8,063,616 B2 * | 11/2011 | Bahramian | H02M 1/08 323/271 |
| 8,072,202 B2 | 12/2011 | Yang et al. | |
| 8,928,388 B2 * | 1/2015 | Lu | H03G 7/004 327/312 |
| 9,537,472 B2 * | 1/2017 | Lu | H03K 5/08 |
| 2016/0036399 A1 | 2/2016 | McCune, Jr. | |
| 2016/0079854 A1 | 3/2016 | Kinzer et al. | |

* cited by examiner

*Primary Examiner* — Gary Nash
(74) *Attorney, Agent, or Firm* — Jeffrey N. Giunta; Fleit Gibbons Gutman Bongini & Bianco P.L.

(57) ABSTRACT

An adjustable threshold power limiter circuit. A number of switching elements are included with at least a first and second switching element that each has a first terminal, a second terminal, and an insulated gate terminal. The switching elements forming a conductive path between its first and second terminals based on a voltage between its insulated gate terminal and one of its first or terminal exceeding a threshold. A conductive path is present with a series connection of the switching elements between a signal input and a reference potential. A controller is included and is electrically coupled to each insulated gate terminal of each switching element to independently provide to each insulated gate terminal either an on voltage or an off voltage.

20 Claims, 7 Drawing Sheets

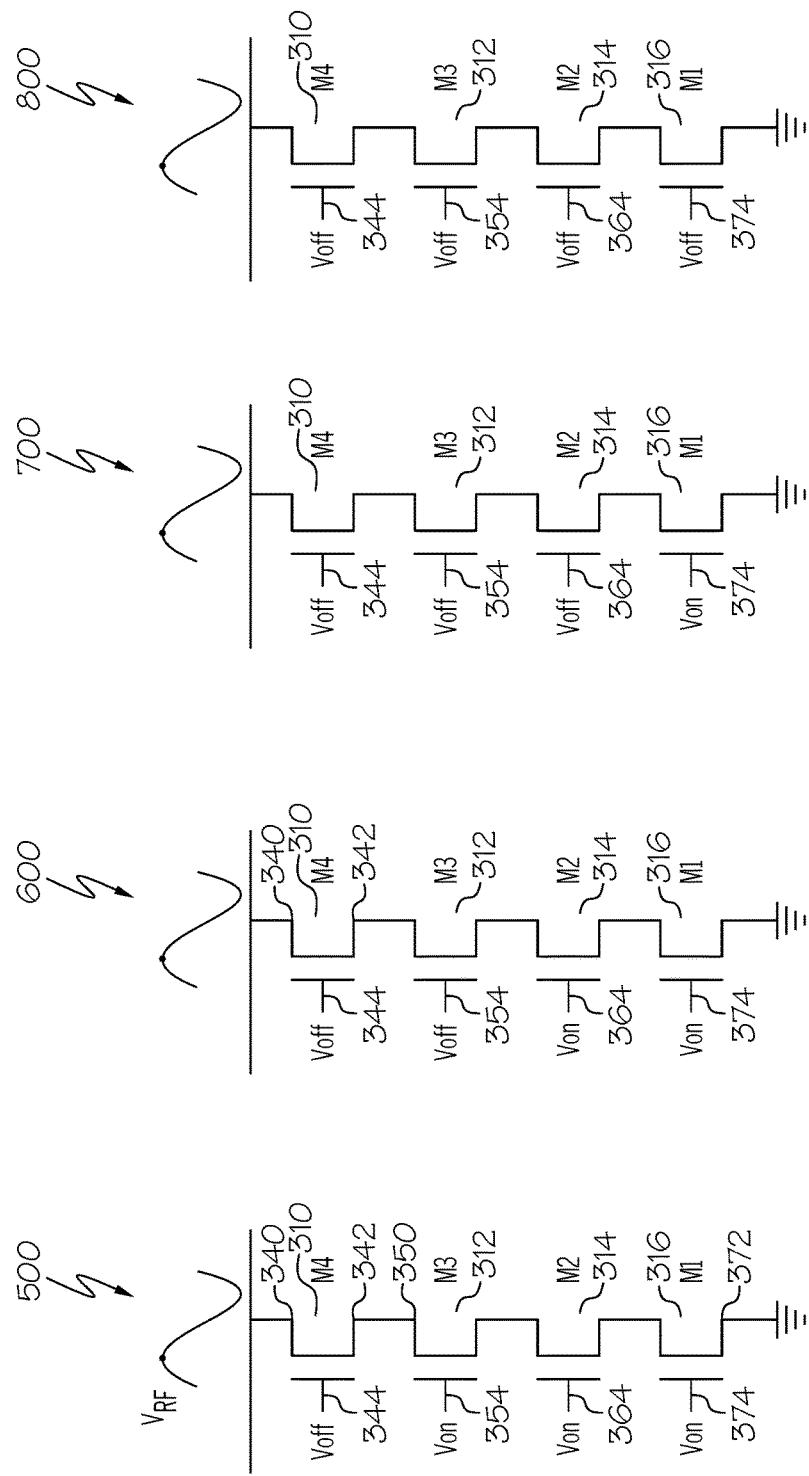

HIGH SPEED PROGRAMMABLE THRESHOLD GALLIUM NITRIDE POWER LIMITER

CROSS-REFERENCE TO RELATED APPLICATIONS

This application is based upon and claims priority from prior U.S. Provisional Patent Application No. 62/180,105, filed on Jun. 16, 2015, and prior U.S. Provisional Patent Application No. 62/180,130, filed on Jun. 16, 2015, the entire disclosures of which are herein incorporated by reference in their entirety.

BACKGROUND

Field

This invention relates generally to solid-state electronic devices, and more specifically to power limiter circuits.

Related Art

A power limiter circuit (hereinafter "limiter circuit") is used in various applications to limit a power level of a signal. Example applications of limiter circuits include radio circuits and systems such as are used with high power radios. Purposes of limiter circuits include the protection of sensitive front-end circuitry of a receiver. For example, a limiter circuit can be used to protect a low noise RF amplifier that may operate in the presence of high RF power. In general, a limiter circuit is placed between a circuit it is protecting and a potential source of high power. The limiter circuit has an input connected to the potential source of high power and an output delivering power to the circuit being protected. In general, a limiter circuit has a power threshold and power below that threshold is delivered to the limiter circuit output with low insertion loss and distortion. When the power at the input exceeds the threshold, the power level is limited to protect the circuit at the output.

Most existing limiter circuits use a one quarter wavelength transmission line in conjunction with PIN diodes and a current source providing a bias current. These PIN diode limiters suffer from many drawbacks. The one quarter wavelength transmission line of these limiter circuits causes the device to be able to operate over a narrow, fixed bandwidth. The power threshold of these limiter circuits is generally fixed by a fixed bias circuit. These bias circuits generally consume significant energy from a power supply for the limiter circuit, and thus increases the energy consumption of the limiter circuit and the complexity and size of the overall limiter circuit that has to include the fairly high current capacity bias circuit to support the operation of the PIN based limiter circuit. Furthermore, these limiter circuits based on PIN diodes generally have limited response and recovery times.

These existing limiter circuits based on PIN diodes often also include an external inductor and capacitors. The one quarter wavelength transmission line, along with those external inductor and capacitors and the relatively high current capacity bias circuit, often cause these existing limiter circuits to be physically large and their ability to be integrated into other components is therefore limited.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 5 illustrates a switching element configuration for a command that equals zero, according to an example.

FIG. 6 illustrates a switching element configuration for a command that equals one, according to an example.

FIG. 7 illustrates a switching element configuration for a command that equals two, according to an example.

FIG. 8 illustrates a switching element configuration for a command that equals three, according to an example.

DETAILED DESCRIPTION

Figure 1:
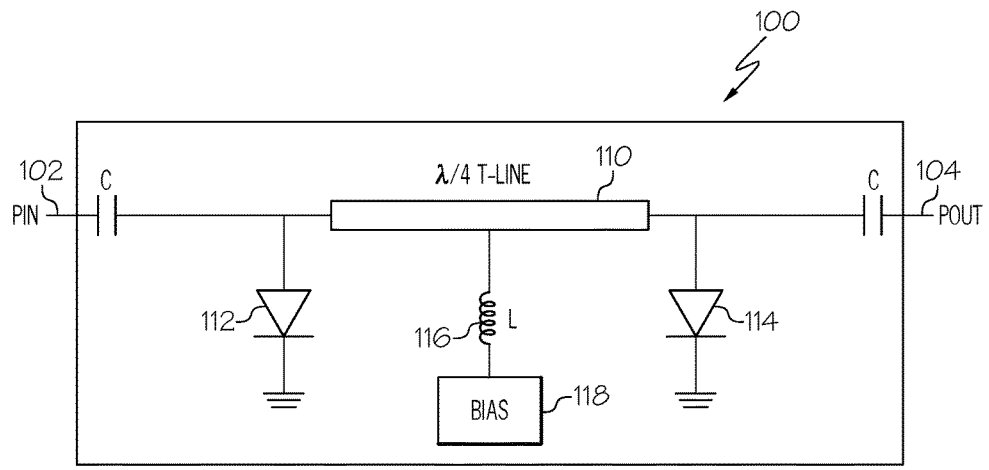
FIG. 1 illustrates an example conventional limiter circuit.

The below described devices and methods advantageously utilize a number of Gallium Nitride (GaN) High Electron Mobility Transistor (HEMT) devices as switching elements that form a limiter circuit. Using insulated gate HEMT in these limiter circuits enables these circuits to use much lower current and thus a smaller size bias current circuit than is used with other technologies, such as PIN based limiter circuits. Due to the smaller size of the bias current circuit that can be used with insulated gate HEMT based limiter circuits, the limiter circuits and bias current source can be integrated in the same package without external passive components. Thus, a significant reduction in the total size and cost of limiter circuits that use insulated gate GaN HEMT technology can be realized.

The below described limiter circuits are able to have thresholds that are directly programmed to different values according to a digital control input using a novel control circuit arrangement. The direct programming by a digital input further reduces the overall complexity of components incorporating these limiter circuits by allowing the direct digital control of the programmed threshold level for the limiter circuit. In an example, the digital programming of the power limiting threshold is achieved by applying equal voltages to all of the insulated gate GaN HEMT devices to cause those to turn "off." Applying equal voltages to the insulated gates of these GaN HEMT switching devices allows a simplified "off" voltage generation circuit to be used, and the use of insulated gate switching devices causes a very low current level to be required for this "off" voltage as is described above. Using an equal "off" voltage for all switching devices simplifies the overall limiter circuit design, particularly over designs that use different gate voltages to set threshold levels.

The below described limiter circuits that utilize GaN HEMT devices is able to be easily integrated with GaN RF switch block circuits to produce a compact and highly functional integrated switch and limiter block.

The below described limiter circuits that include GaN HEMT devices exhibit response and recovery time of <0.1 ns. The lack of a one quarter wavelength transmission line in the below described limiter circuits further allow these limiter circuits to perform limiting functions over a very broad bandwidth.

These GaN HEMT switching elements in an example are connected in a series arrangement as a shunt circuit between a signal line and ground. These systems advantageously use insulated gate GaN HEMT devices, which intrinsically have very low gate currents. These intrinsically low gate currents allow the limiter circuit to use a power supply with a low electrical current capacity to supply the gate control voltages to these switching elements. The low gate current of these devices facilitates the design of integrated circuits that use a negative gate voltage. In such circuits, the negative gate voltage is able to be generated by a low current capacity voltage inverter that is able to be realized as a smaller physical circuit that can be more practically incorporated into a single package with the switching elements, integrated into a controller circuit, or both. Integrating the negative voltage generating voltage advantageously allows the creation of small and compact limiter circuits.

The GaN HEMT devices used in the below described limiter circuits have a very high power and voltage capacity. Use of GaN HEMT devices in such applications advantageously allow the design of relatively simple and compact circuits that are capable of operating with high signal power and voltages. Further, these GaN HEMT based limiter circuits do not include a one quarter wavelength transmission line and therefore are not band limited as are the above described existing limiter circuits that are based on PIN diodes. These GaN HEMT based limiter circuits are able to operate over a very large bandwidth and not using PIN diodes allows these GaN HEMT based limiter circuits to not require a large bias current. Further, these GaN HEMT based limiter circuits exhibit fast response and recovery times.

The below described limiter circuits are able to have an adjustable limiting threshold value. In some examples, the maximum limited power threshold of the below described limiting circuits is able to be specified by a digital input. In an example, the maximum limiting power threshold is adjusted by driving the gates of a certain number of transistors with a $V_{off}$ voltage level that is used for all transistors. Using the same $V_{off}$ values for all transistors that are turned "off" allows simplified circuitry to generate that single voltage as well as control circuitry that selectively routes the generated $V_{off}$ to the gates of selected transistors. The use of insulated gate switching devices, such as the GaN HEMT transistors described in the examples below, causes this $V_{off}$ to only require very low current levels and allows the circuit generating the $V_{off}$ to be physically small.

In an example, the digital value specifying the maximum limited power threshold is received and decoded by a simple digital circuit. This decoder produces digital control outputs that have binary values reflecting the state of each GaN HEMT transistor. Based on the logic level of the digital control output line, the voltage level on each of these decoded digital control output lines is then level shifted to either to a $V_{on}$ voltage, if the digital control output is "on," or a $V_{off}$ voltage if the digital control output is "off." In an example, Von is approximately zero volts and causes the GaN HEMT to be biased "on." In an example, $V_{off}$ is a negative voltage selected to be a value as is described below and generally causes the GaN HEMT to be biased "off." The negative $V_{off}$ voltage is generated in an example by a voltage inverter circuit. The digital control output lines that have their voltage levels shifted to either a $V_{off}$ value or a $V_{on}$ value are coupled to the gates of the transistors to control the threshold level of the limiter circuit, as is described in further detail below.

In some configurations, the GaN HEMT devices operate in a depletion mode and a particular transistor is turned off by applying a sufficiently large negative voltage to the gate of that transistor. In further examples, enhancement mode devices are able to be used that are able to be operated with a positive gate voltage. Such a configuration obviates a need to generate a negative voltage to apply to the gates of transistors to be turned off.

FIG. 1 illustrates an example conventional limiter circuit 100. The conventional limiter circuit 100 includes a quarter wavelength transmission line 110 with a first PIN diode 112 coupling one end of the quarter wavelength transmission line 110 to ground and a second PIN diode 114 coupling the other end of the quarter wavelength transmission line 110 to ground. Each end of the quarter wavelength transmission line 110 also has capacitive coupling to an input port 102 and an output port 104. The threshold of the limiter circuit is determined by a fixed bias circuit 118 that couples to the quarter wavelength transmission line 110 through an inductor 116.

In general, the response and recovery time in this example conventional limiter circuit are limited by the first PIN diode 112 and the second PIN diode 114. The bandwidth over which the limiter circuit can effectively operate is also limited by the quarter wavelength transmission line 110 of this example conventional limiter circuit thereby causing this circuit to generally be a narrowband device. The physical size of devices used to realize the inductor 116 and capacitors in this example circuit limit how small the physical size of such a circuit can become. The relatively large size of these components of the example conventional limiter circuit 100 can limit the ability to package such circuits in a microelectronic package.

Figure 2:
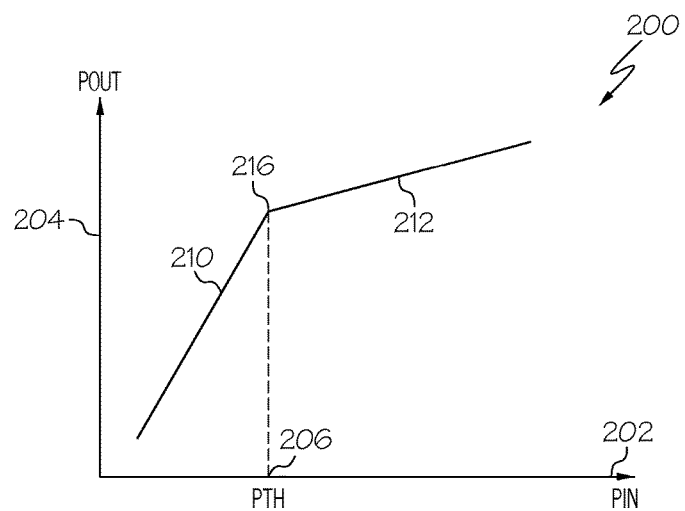
FIG. 2 illustrates a power-in vs. power-out transfer function for an example conventional limiter circuit such as is illustrated in FIG. 1

FIG. 2 illustrates a power-in vs. power-out transfer function 200 for an example conventional limiter circuit 100 such as is illustrated in FIG. 1. The illustrated power-in vs. power-out transfer function 200 includes a power-in axis 202, which indicated the power provided into the input port 102, and a power-out axis 204, which indicates the power delivered from the output port 104. The power-in vs. power-out transfer function 200 includes a non-limited output portion 210 and a limited output power portion 212. When the input power is below a threshold $P_{th}$ 206, the example conventional limiter circuit 100 operates in a non-limited output portion 210 and the output power level corresponds to the input power level. When the input power exceeds the threshold $P_{th}$ 206, the example conventional limiter circuit 100 operates in limited output power portion 212 and the output power level increases much more slowly than the input power level. This reduction in output power increases beyond the threshold $P_{th}$ 206 illustrates the power limiting operation of limiter circuits in general.

Figure 3:
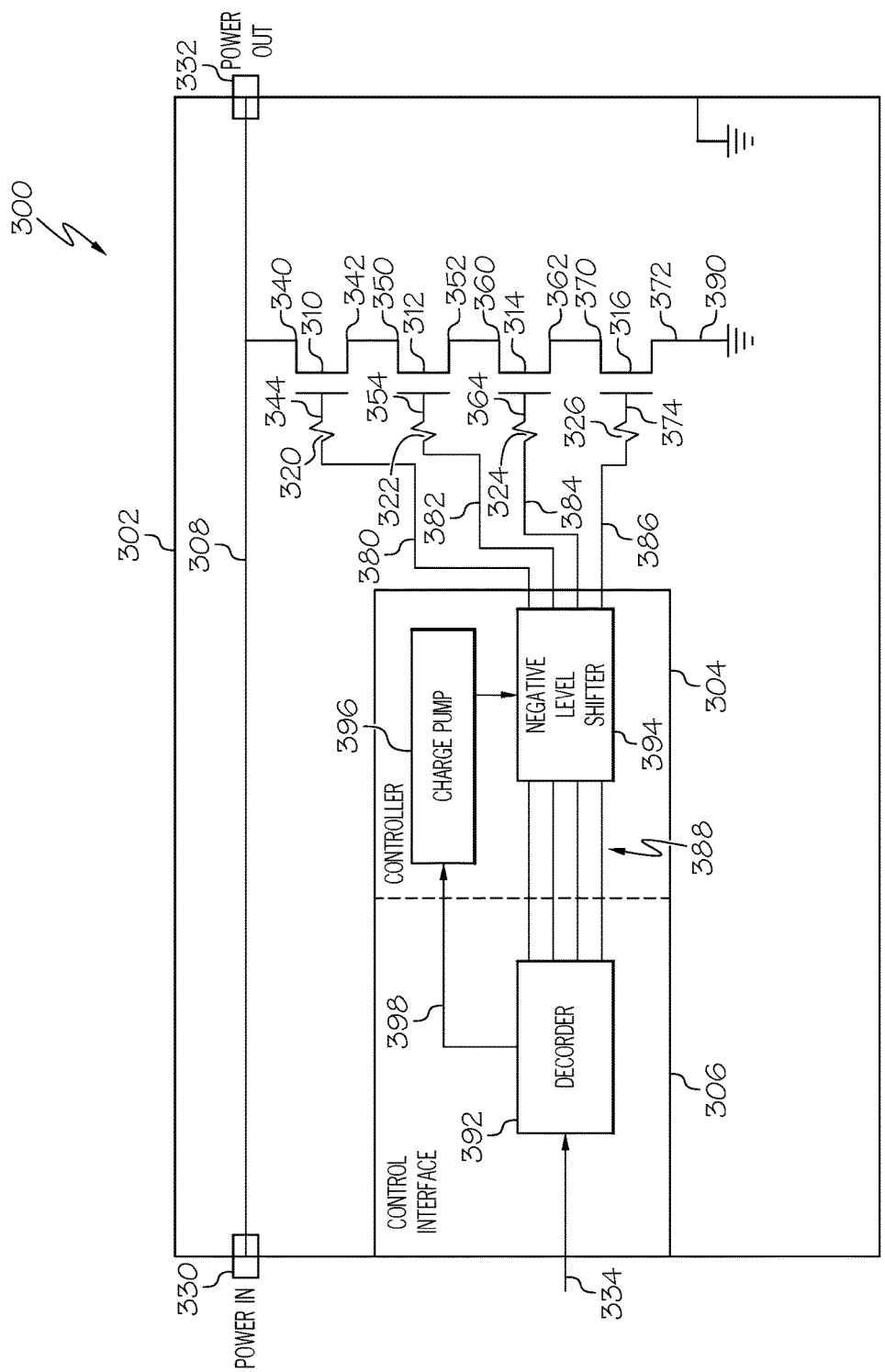
FIG. 3 illustrates an example programmable limiter circuit, according to an example.

FIG. 3 illustrates an example programmable limiter circuit 300, according to an example. The illustrated example programmable limiter circuit 300 is a high-speed, programmable-threshold, limiter circuit that includes Gallium Nitride (hereinafter "GaN") devices. As is described below, the illustrated example programmable limiter circuit 300 advantageously provides improved response and recovery time relative to PIN based limiter circuits and the GaN devices allow the example programmable limiter circuit 300 to be realized with reduced size and increased device integration relative to other circuits, thereby increasing its suitability for construction in a microelectronic package or inclusion with other integrated components. The high voltage abilities of GaN HEMT switching devices allow these limiter circuits to be used in high voltage applications. Further, the illustrated example programmable limiter circuit 300 does not include a one quarter wavelength transmission line and thus is a broad bandwidth device. The use of insulated gate GaN HEMT switching devices greatly reduces the electrical current used to bias these switching devices and greatly simplifies the bias voltage generation circuit and allows a smaller overall limiter circuit to be constructed.

The example programmable limiter circuit 300 is an example of an RF power limiter device 302. In general, an RF power limiter device 302 is able to be constructed as a separate device within its own enclosure, incorporated within another electronic device, construction in any suitable arrangement, or combinations of these. The illustrated RF power limiter device 302 has a power-in port 330 that is conductively coupled to a power-out port 332 by a signal input line 308.

The example programmable limiter circuit 300 includes number of series connected switching elements that are connected in series with one another in a shunt configuration between the signal input line 308 and a ground 390. The illustrated example programmable limiter circuit 300 includes four (4) GaN HEMT switching elements, although further examples are able to include any suitable number of devices based on various design goals for the limiter circuit.

Each GaN HEMT switching element in this example is a depletion mode transistor that has an insulated gate terminal and two other terminals referred to as a source terminal and a drain terminal. As is understood by practitioners of ordinary skill in the relevant arts, the insulated gate terminal of an HEMT operates as a control terminal and a conductive path between the source and the drain of that GaN HEMT is able to be formed based on the voltage between the insulated gate terminal and one of the source terminal or drain terminal. In general, when the voltage between the insulated gate terminal and one other terminal of the GaN HEMT device exceeds a threshold, a conductive path is formed between the source terminal and the drain terminal.

The series connected switching elements in the example programmable limiter circuit 300 include a first transistor 310, a second transistor 312, a third transistor 314, and a fourth transistor 316. These four transistors are connected in a series arrangement with one another to form a shunt circuit between a signal input line 308 and ground 390. These transistors are an example of a plurality of insulated gate switching elements. The first transistor 310 has a first source 340, a first drain 342 and a first insulated gate 344. The second transistor 312 has a second source 350, a second drain 352 and a second insulated gate 354. The third transistor 314 has a third source 360, a third drain 362 and a third insulated gate 364. The fourth transistor 316 has a fourth source 370, a fourth drain 372 and a fourth insulated gate 374. In the illustrated series connection of these switching elements, the first source 340 is connected to the signal input line 308 and the first drain 342 is connected to the second source 350. The second drain 352 is connected to the third source 360 and the third drain 362 is connected to the fourth source 370. The series connected shunt circuit of GaN HEMTs has the fourth drain 372 connected to a ground 390. In this illustrated example, the first transistor 310 is a first switching element and the fourth transistor 316 is a second switching element. In this example, the second transistor 312 and third transistor 314 are intermediate switching elements that are connected in series between the first switching element and the second switching element.

The use of GaN HEMT switching elements in the example programmable limiter circuit 300 provides several advantages over conventional limiter circuits. For example, the use of high-voltage handling, insulated gate HEMT allows a low current, low capacitance, negative voltage bias circuit to be used that can be integrated on a single integrated circuit of a CMOS circuit implementing the controller 304, the control interface 306, other circuits, or combinations of these. The example programmable limiter circuit 300 does not require a variable negative voltage to set its threshold; instead, its threshold is able to be set using programmable digital logic pins of the control interface 306.

A GaN HEMT as is used in the example programmable limiter circuit 300 is a high mobility device that turns ON fast once a gate-source/gate-drain voltage exceeds a pinch-off voltage. Similarly, a GaN HEMT also turns OFF once gate-drain/gate-source voltage is below the pinch-off voltage. This property of an HEMT is exploited in the example programmable limiter circuit 300, which has a sub-nanosecond response and recovery time. The example programmable limiter circuit 300 also does not use a specific electrical length transmission line or passive components, thus achieving a very broadband response.

The use of insulated gate GaN HEMT switching elements allows significant reduction in the total size of a limiter circuit. The example programmable limiter circuit 300 is realized with insulated gate HEMTs which enable using a much lower current and smaller size bias circuit that can be completely integrated in a microelectronic package without external passive components. Accordingly, the example programmable limiter circuit 300 and other high voltage GaN HEMTs can be advantageously contained within a same microelectronic package. Furthermore, the example programmable limiter circuit 300 and other high voltage GaN HEMTs can be advantageously integrated on a same die.

The example programmable limiter circuit 300 includes a controller 304 that has a separate control output line that is electrically connected to each gate of the four (4) GaN HEMT switching elements. The illustrated controller 304 has a first control line 380 connected to the first insulated gate 344 through first gate resistor 320, a second control line 382 connected to the second insulated gate 354 through second gate resistor 322, a third control line 384 connected to the third insulated gate 364 through third gate resistor 324, and a fourth control line 386 connected to the fourth insulated gate 374 through fourth gate resistor 326.

In the illustrated example programmable limiter circuit 300, the voltage between the signal input line 308 and ground 390 is divided equally across each switching element, i.e., across the first transistor 310, the second transistor 312, the third transistor 314, and the fourth transistor 316. In an example, the size of each of these transistors is equal. As is described below, the threshold is set by setting the gate voltage of one or more of these transistors to an "on voltage" ($V_{on}$) at which the transistor conducts, and setting the gate voltage of the other transistors to an "off voltage" ($V_{off}$) that generally causes the transistor to be in an off condition where the transistor does not conduct between its source and drain while the input power is below the set threshold. The threshold in this example is set by a setting the $V_{off}$ voltage such that at certain input power, an OFF HEMT (which has its gate held at $V_{off}$) turns ON once its gate to drain/source voltage exceeds a pinch-off voltage of the device.

In the illustrated example, the threshold is changed by changing number of OFF HEMTs (i.e., transistors with gate voltages at $V_{off}$) with the value of $V_{off}$ fixed at a design value. For example, when only the first transistor 310 is "OFF" (i.e., has a gate voltage of $V_{off}$) and the other transistors are "ON" (i.e., their gates are held at $V_{on}$). In this configuration, approximately the entire voltage between the signal input line 308 and ground 390 is across the first transistor 310 because the other transistors are biased to be "on" and thus do not have appreciable voltage between their source and drain terminals. The first transistor 310 in this example will reach a pinched-off state at much lower input power on the signal input line compared to when all four transistors are OFF. In this example, where only the first transistor 310 is "off," when the power of the signal input line 308 causes the voltage on the first insulated gate 344, in combination with the $V_{off}$ present on the other side of the first gate resistor 320, to exceed the pinch-off voltage of the first transistor 310, the first transistor will also conduct from its source to its drain. Because the other transistors are biased to be in an "ON" condition with $V_{on}$ on their insulated gates, all four transistors are turned ON and form a low impedance path to ground. The low impedance of these ON HEMTs reflects most of the power on the power-in port 330 back to its source and thus limits the maximum power delivered to a load.

In the case where $V_{off}$ is applied to the first insulated gate 344 and the second insulated gate 354, and $V_{on}$ is applied to the third insulated gate 364 and the fourth insulated gate 374, the third transistor 314 and fourth transistor 316 are biased to have a conducting channel between their sources and drains. The voltage between the signal input line 308 and ground 390 is then divided equally across the sources and drains of the first transistor 310 and the second transistor 312 because those transistors are biased to be "off." In this configuration, the first transistor 310 and the second transistor 312 will reach a pinched-off state at approximately twice the voltage between the signal input line 308 and ground 390 than in the prior scenario where only the first transistor 310 was biased "off."

The example programmable limiter circuit 300 in an example has a control interface 306 that includes a threshold command input 334. The threshold command input 334 receives a command indicating a present threshold level for the example programmable limiter circuit 300. In an example, the example programmable limiter circuit 300 passes energy between the power-in port 330 and the power-out port 332 when the signal at the power-in port 330 is below that present threshold level corresponding to the command received via the threshold command input 334. When the signal at the power-in port 330 exceeds the commanded present threshold level, the power conveyed through the example programmable limiter circuit 300 is limited based on the present threshold level.

The threshold command input 334 is able to be configured to receive commands indicating the present threshold level in any suitable form. In an example, the command indicating the present threshold level is received as digital data that contains a binary indication of the present threshold level. The control interface 306 in an example includes a decoder 392 that processes the digital data received from the threshold command input 334 and provides decoded switch command 388 to the controller 304 as is described below. In some examples, the decoder 392 is also able to provide a $V_{off}$ control command 398 to charge pump 396 or other negative voltage generator used by the controller 304 in order to control the value of $V_{off}$ based upon commands received via the threshold command input 334.

The controller 304 of one example is able to separately and independently set the voltage provided on each control line, and thus separately control the voltage that is applied to each insulated gate of the separate GaN HEMT switching elements. In an example of GaN HEMT switching elements, a negative voltage is applied to an insulated gate to turn off that transistor. Because the GaN HEMT devices of the example programmable limiter circuit 300 have insulated gates, the negative voltage applied to each insulated gate has very low electrical current. In one example, the controller 304 is able to turn "on" a particular GaN HEMT switching element by providing its insulated gate with a voltage, referred to as $V_{on}$, that is near ground or other suitable level. The controller is able to turn "off" a particular GaN HEMT switching element by providing its insulated gate with a suitable low voltage referred to as $V_{off}$. In some examples, a single voltage is used for the $V_{off}$ provided to each switching element, and another single voltage is used for the $V_{on}$ provided to each switching element. In further examples, different values of voltages may be used for respective off voltages that are values of respective $V_{off}$ that are provided to the respective switching elements, different values of voltages may be used for respective on voltages that are values of respective $V_{on}$ that are provided to the respective switching elements, or a set of different values of voltages are able to be used for respective $V_{on}$ and another set of different voltages are able to be used for respective $V_{off}$.

In an example, an "off voltage" $V_{off}$ of negative fifteen volts (−15V) is used. Because a particular GaN HEMT switching element will start to conduct based upon the transistor's source voltage relative to the $V_{off}$ on the gate of that transistor, the value of $V_{off}$ affects the level at which the switching element will start to conduct, and thus is able to be selected as part of the design to set the threshold levels that are able to be programmed for the example programmable limiter circuit 300. In some examples, as is described below, the value of the negative voltage provided as the "off voltage" $V_{off}$ by the controller 304 to the insulated gates of the GaN HEMT switching elements is able to be adjusted by a command received via the control interface 306. Allowing a received command to adjust the value of the "off voltage" $V_{off}$ allows further adjustment of the threshold level of the example programmable limiter circuit 300.

In an example, the example programmable limiter circuit 300 changes the present threshold level by changing the number of switching elements that have $V_{off}$ on their insulated gates and which have $V_{on}$. In an example, decoder 392 includes a 2-bit to 4-bit digital decoder that accepts a two-bit command to set the current threshold level to one of four available levels. In an example, the two bits represent numbers between zero and three (i.e., [0-3]). In an example, one switching element is off so that a minimum threshold level is maintained. The command number in such an example is one less than the number of transistors are "off" (i.e., have $V_{off}$ applied to their insulated gates). In an example, if a transistor does not have $V_{off}$ applied to its insulated gate, Von is applied. For example, if the two-bit command is binary "01" (decimal "2"), the controller 304 would apply Von to the third insulated gate 364 and the fourth insulated gate 374 and apply $V_{off}$ to the first insulated gate 344 and the second insulated gate 354. Thus, only two "off" devices (the first transistor 310 and second transistor 312) are in series and the third transistor 314 and the fourth transistor 316 are "on." The illustrated example programmable limiter circuit 300 has a provision for a two-bit threshold adjust. The number of bits, and the corresponding number of switching elements, could be higher or lower depending on application requirement. The relationship between specific threshold level commands and the voltages applied to the insulated gates of the GaN HEMT switching elements is described in further detail below.

In the illustrated example, the controller 304 includes a charge pump 396 that is used to generate this negative voltage from a positive supply voltage. The charge pump 396 is an example of a voltage inverter circuit. In some examples, the charge pump 396 generates a single voltage that is the $V_{off}$ that is applied to insulated gates of GaN HEMT switching elements when the switching element is to be "off." In an example, the charge pump 396 receives a positive supply voltage used to provide operating power to the controller 304 and any other circuits of the example programmable limiter circuit 300. In various examples, any type of negative voltage generator is able to be used, or a negative voltage is able to be obtained from any suitable source within or outside of the example programmable limiter circuit 300. In an example, a low electrical current capacity charge pump 396, or other negative voltage generator, is able to be used because the insulated gates of the GaN HEMT switching elements draw very little current. In some examples, this allows the charge pump or other negative voltage generator to be included in the integrated circuit device or die implementing the controller 304.

In an example, the decoder 392 includes a digital decoder logic element with output lines that converts digital data specifying the present threshold level to logic levels on those output lines. In an example, these logic levels are one of two values that represent binary data values of "0" and "1" that can be referred to as an "off" logic level and an "on" logic level. In such an example, these logic levels are provided to a negative level shifter 394. The negative level shifter 394 shifts the logic levels produced by the logic element of the decoder 392 to $V_{off}$ for "off" logic levels, and to $V_{on}$ for "on" logic levels. In an example, $V_{on}$ is set to zero (0) but other voltage levels may be used for $V_{on}$. In an example, $V_{off}$ is the negative voltage generated by the charge pump 396. The $V_{off}$ generated by the charge pump 396 is also able in some examples to be adjusted based on various factors, such as commands to vary that voltage.

In an example, in addition to setting the present threshold level by controlling which GaN HEMT switching elements are "ON" and which are "OFF," the present threshold level is also able to be controlled by an external command that changes the value of "off voltage" $V_{off}$. A gate control voltage command input, which is part of the control interface 306 in an example, is able to receive a command indicating a voltage to be applied as an off voltage to the GaN HEMT switching elements. In an example, the charge pump 396 is a programmable charge pump that is able to change its output voltage based on command received via the $V_{off}$ control command 398. For example, the charge pump 396 is able to be a charge pump with a selectable number of stages. In an example, the charge pump 396 has a selectable number of stated that are selectable to set the output voltage of the charge pump 396, which is the off voltage applied to the insulated gates of the GaN HEMT switching elements. Examples with such a programmable charge pump 396, the output voltage is able to be digitally programmable to different values by switching in a different number of stages of the charge pump. In an example, the decoder 392 is able to receive an off voltage command that specifies an off voltage value via the threshold command input 334, and the decoder is then able to configure the charge pump 396 to use a particular number of stages to generate the negative off voltage. The charge pump in an example receives the $V_{off}$ control command 398 to cause the charge pump 396 to output one voltage from among a number of available output voltages. In an example, the $V_{off}$ control command 398 causes the charge pump 396 to be configured to use a different number of stages of the charge pump to be used to generate the indicated $V_{off}$. Because the example programmable limiter circuit 300 uses GaN devices that each have an insulted gate, the gate leakage current is very small and an integrated charge pump circuit can be used without any external components.

Figure 4:
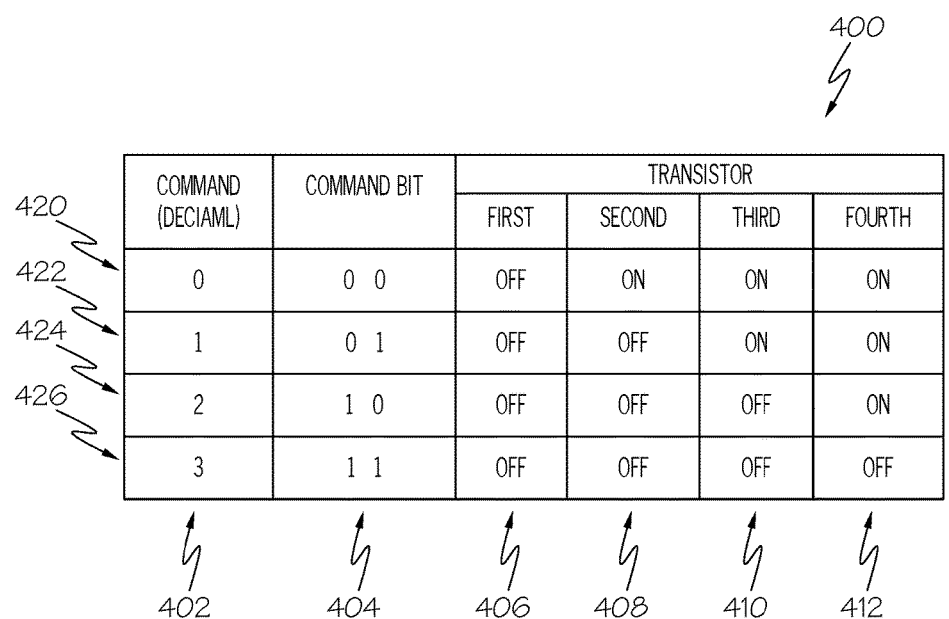
FIG. 4 illustrates a threshold level command to transistor control relationship, according to an example.

FIG. 4 illustrates a threshold level command to transistor control relationship 400, according to an example. With reference to the example programmable limiter circuit 300 illustrate in FIG. 3, the threshold level command to transistor control relationship 400 shows the response of the controller 304 to various received threshold level commands. The threshold level command to transistor control relationship 400 includes a command decimal value column 402, a command bit column 404 that depicts the binary command values as the zero (0) and one (1) value of each of the two command bits. The threshold level command to transistor control relationship 400 further depicts the state of each transistor depicted for the example programmable limiter circuit 300, with a first transistor column 406 indicating the state of the first transistor 310, a second transistor column 408 indicating the state of the second transistor 312, a third transistor column 410 indicating the state of the third transistor 314, and a fourth transistor column 412 indicating the state of the fourth transistor 316. The threshold level command to transistor control relationship 400 has for lines that depict the configuration of GaN HEMT switching elements for each of the four possible commands represented by the two input bits. These four transistor configurations are depicted in FIGS. 5-8 with reference to FIG. 4, as is discussed below.

FIG. 5 illustrates a switching element configuration for a command that equals zero 500, according to an example. The switching element configuration for a command that equals zero 500 depicts the configuration of example programmable limiter circuit 300 when the control interface 306 receives a threshold command value of zero (0) or a binary value of "00." With reference to the threshold level command to transistor control relationship 400 of FIG. 4, a first line 420 of the threshold level command to transistor control relationship 400 depicts these values for a binary threshold level command of zero (0). This corresponds to the lowest threshold level that can be configured for this example programmable limiter circuit 300. The first line 420 shows the decimal value "0" and binary values "0,0." In the illustrated example programmable limiter circuit 300, the decoder 392 receives this "0,0" binary value and generates a decoded switch command 388 that causes the controller 304 to configure the first transistor 310 to be "off" by placing $V_{off}$ to the first control line 380 and the first insulated gate 344. In an example, $V_{off}$ is placed on the first control line 380 by the negative level shifter 394 switching the negative voltage generated by the charge pump to the first control line 380. The first line 420 further shows that the second transistor 312, the third transistor 314, and the fourth transistor 316 are configured to be "on." In an example, the decoded switch command 388 produced by the decoder 392 causes the controller 304 to place $V_{on}$ on the second control line 382, the third control line 384, and the fourth control line 386, and therefore on the second insulated gate 354, the third insulated gate 364, and the fourth insulated gate 374. In an example, $V_{on}$ is ground. In further examples $V_{on}$ is able to be any suitable value.

FIG. 6 illustrates a switching element configuration for a command that equals one 600, according to an example. The switching element configuration for a command that equals one 600 depicts the configuration of example programmable limiter circuit 300 when the control interface 306 receives a threshold command value of one (1) or a binary value of "01." With reference to the threshold level command to transistor control relationship 400 of FIG. 4, a second line 422 of the threshold level command to transistor control relationship 400 depicts these values for a binary threshold level command of one (1). This sets the limiter threshold value to its second level just above the lowest level set by the zero command described above. The second line 422 shows the decimal value "1" and binary values "0,1." In this case, the decoder 392 receives the "0,1" binary value and generates a decoded switch command 388 that causes the controller 304 to configure the first transistor 310 and second transistor 312 to be "off" by placing $V_{off}$ to the first control line 380 and the second control line 382, and therefore on the first insulated gate 344 and the second insulated gate 354. The decoded switch command 388 produced by the decoder 392 further causes the controller 304 to configure the third transistor 314 and the fourth transistor 316 in this case to be "on." In an example, the controller 304 places $V_{on}$ on the third control line 384, and the fourth control line 386, and therefore on the third insulated gate 364 and the fourth insulated gate 374.

FIG. 7 illustrates a switching element configuration for a command that equals two 700, according to an example. The switching element configuration for a command that equals two 700 depicts the configuration of example programmable limiter circuit 300 when the control interface 306 receives a threshold command value of two (2) or a binary value of "10." With reference to the threshold level command to transistor control relationship 400 of FIG. 4, a third line 424 of the threshold level command to transistor control relationship 400 depicts these values for a binary threshold level command of one (1). The third line 424 shows the decimal value "2" and binary values "1,0." In this case, the decoder 392 receives the "1,0" binary value and generates a decoded switch command 388 that causes the controller 304 to configure the first transistor 310, the second transistor 312, and the third transistor 314 to be "off" by placing $V_{off}$ on the first control line 380, the second control line 382, and the third control line 384, and therefore on the first insulated gate 344 the second insulated gate 354, and the third insulated gate 364. The decoded switch command 388 produced by the decoder 392 further causes the controller 304 to configure fourth transistor 316 in this case to be "on." In an example, the controller 304 places $V_{on}$ on the fourth control line 386 and therefore on the fourth insulated gate 374.

FIG. 8 illustrates switching element configuration for a command that equals three 800, according to an example. The switching element configuration for a command that equals three 800 depicts the configuration of example programmable limiter circuit 300 when the control interface 306 receives a threshold command value of three (3) or a binary value of "11." With reference to the threshold level command to transistor control relationship 400 of FIG. 4, a fourth line 426 of the threshold level command to transistor control relationship 400 depicts these values for a binary threshold level command of three (3). The fourth line 426 shows the decimal value "3" and binary values "1,1." In this case, the decoder 392 receives the "1,1" binary value and generates a decoded switch command 388 that causes the controller 304 to configure the first transistor 310, the second transistor 312, the third transistor 314, and the fourth transistor to all be "off" by placing $V_{off}$ to the first control line 380, the second control line 382, the third control line 384, and the fourth control line 386.

Figure 9:
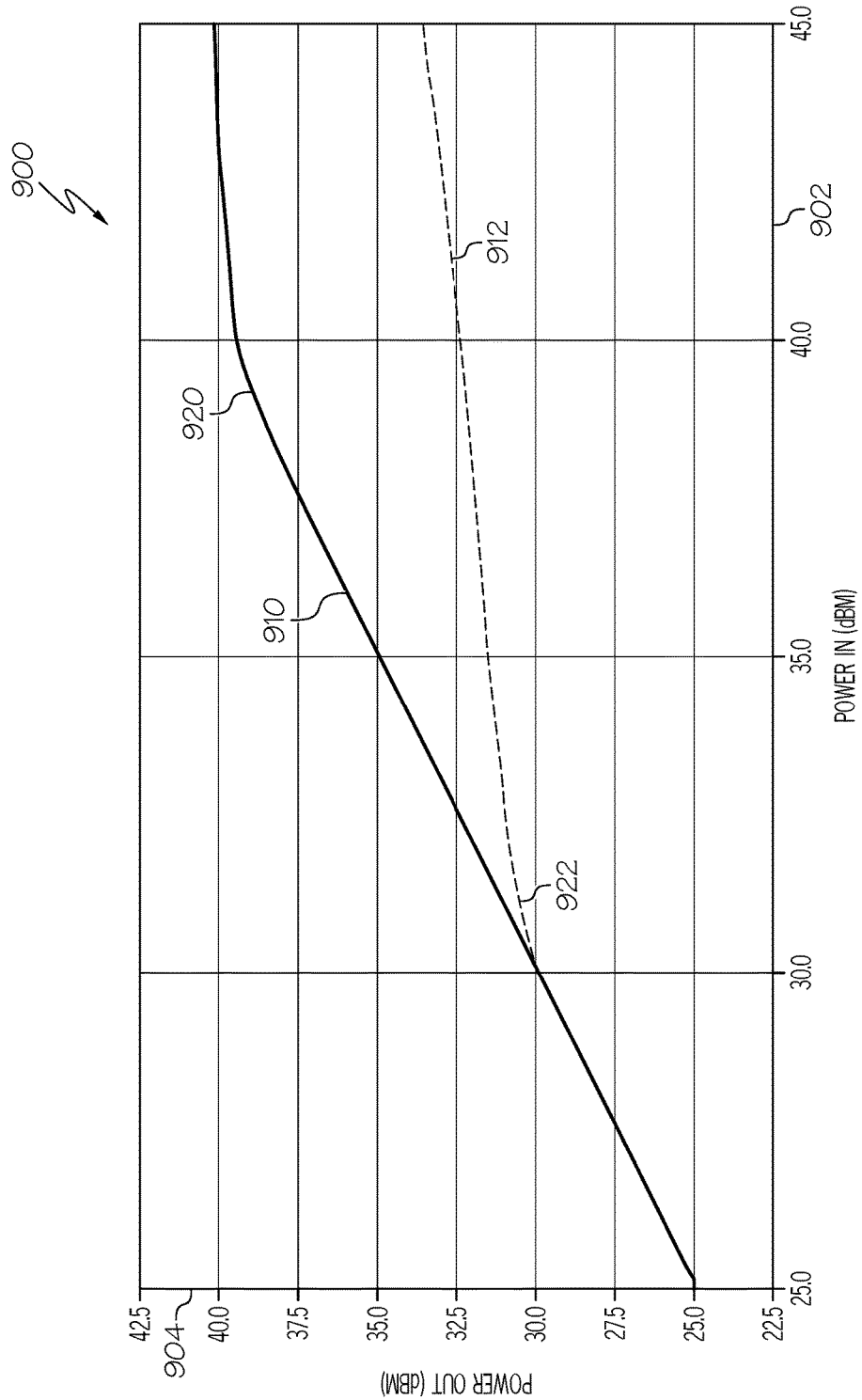
FIG. 9 depicts a power-out versus power-in graph of the example programmable limiter circuit of FIG. 3, according to an example.

FIG. 9 depicts a power-out versus power-in graph 900 of the example programmable limiter circuit 300, according to an example. The power-out versus power-in graph 900 includes a power-in axis 902 and a power-out axis 904. With reference to example programmable limiter circuit 300 of FIG. 3, the power-in axis 902 reflects the power going into the power-in port 330 and the power-out axis 904 reflects the power produced out of the power-out port 332. The power-out versus power-in graph 900 depicts two transfer plots, a high threshold level transfer plot 910 and a low threshold level transfer plot 912. In an example, these plots reflect a $V_{off}$ of −5V.

The high threshold level transfer plot 910 shows a high limiting threshold level 920 of approximately 38 dBm. In an example, this corresponds to a threshold level command of one (1) that is the second lowest level selectable for the example programmable limiter circuit 300. The low threshold level transfer plot 912 shows the threshold level to be at a lower level of approximately 30 dBm. In an example, this corresponds to a threshold level command of zero (0), which is the lowest selectable threshold level for the example programmable limiter circuit 300. The example programmable limiter circuit 300 in an example achieves response and recovery time of less than 0.1 ns. The responses depicted in the power-out versus power-in graph 900 in an example are expected for input signals with frequencies of 500 MHz, 1 GHz and 2 GHz, thereby reflecting the broadband nature of these circuits.

Figure 10:
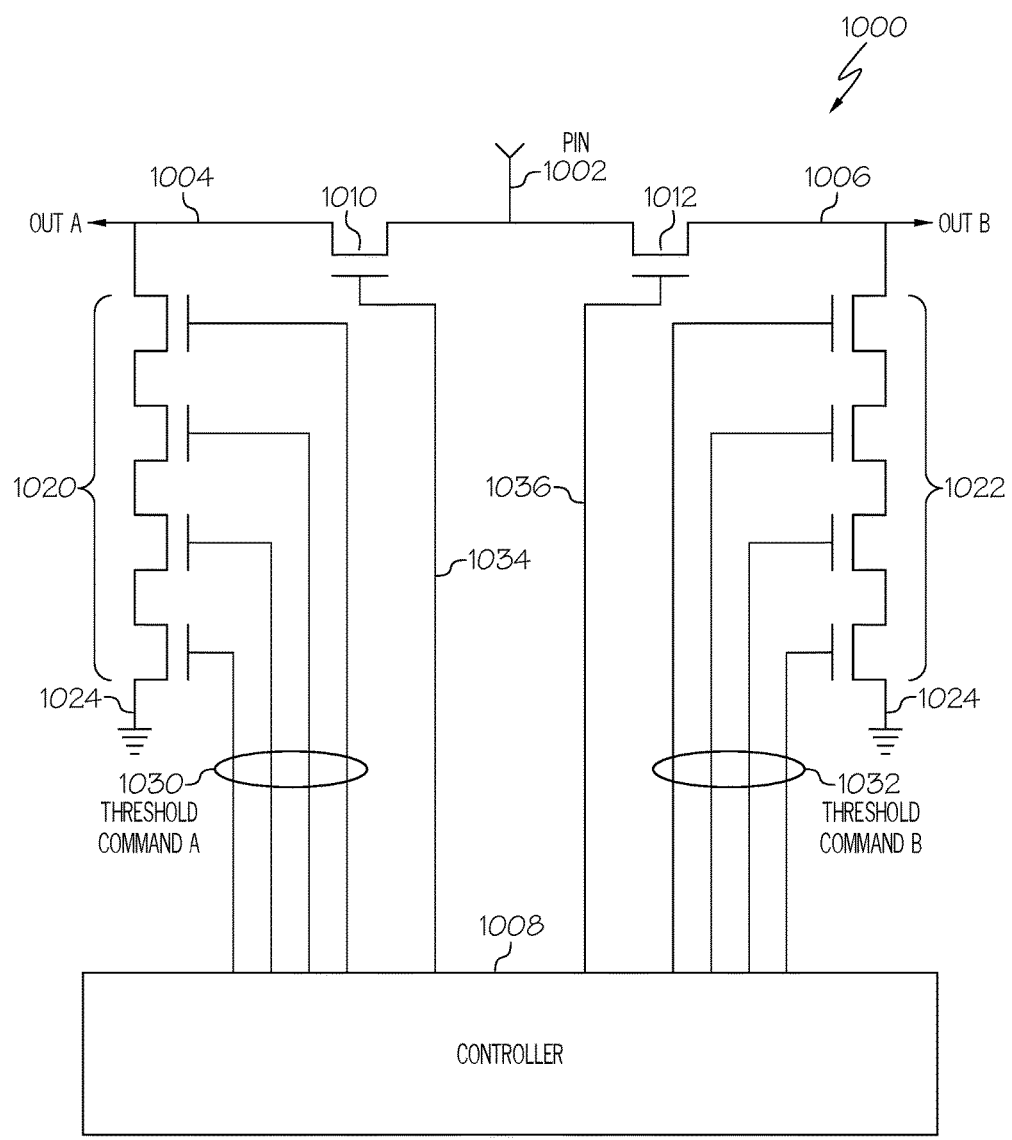
FIG. 10 illustrates a Radio Frequency (RF) switch block with integrated GaN-based limiter circuit, according to an example.

FIG. 10 illustrates a Radio Frequency (RF) switch block with integrated GaN-based limiter circuit 1000, according to an example. The RF switch block with integrated GaN-based limiter circuit 1000 is an example of a combination signal switch and adjustable power limiter circuit. This example combination signal switch and adjustable power limiter circuit illustrates integrating the above described example programmable limiter circuit 300 with at least one other GaN based devices to realize a high level of device integration.

The RF switch block with integrated GaN-based limiter circuit 1000 has a Power-In (Pin) port 1002 that is an example of a signal input. The Pin Port 1002 is electrically connected to a respective source of two GaN HEMT switching transistors, a first series transistor 1010 and a second series transistor 1012. These series switching transistors are examples of series switching elements coupling the signal input, Pin port 1002, to a first signal output or a second signal output. The drain of the first series transistor 1010 drives a first output port $Out_a$ 1004 with a first programmable limiter circuit 2020 connected as a shunt to ground 1024. The drain of the second series transistor 1012 drives a second output port $Out_b$ 1006 with a second programmable limiter circuit 1022 connected as a shunt to ground 1024. These series switching transistors are examples of series switching elements coupling the signal input, Pin port 1002, to a first signal output or a second signal output.

The first programmable limiter circuit 1020 and the second programmable limiter circuit 1022 are similar to the above described example programmable limiter circuit 300. In an example, the first programmable limiter circuit 1020 has a first plurality of switching elements that form a first conductive path between the first output port Out$_a$ 1004 and ground 1024. These plurality of switching elements are connected in a series arrangement. The second programmable limiter circuit 1022 has a second plurality of switching elements that form a second conductive path between the second output port Out$_b$ 1006 and ground 1024. These plurality of switching elements are connected in a series arrangement. In this example, ground 1024 is a reference potential.

The RF switch block with integrated GaN-based limiter circuit 1000 has a controller 1008 that provides a first gate voltage 1034 to the first series transistor 1010 and a second gate voltage 1036 to the second series transistor 1012 in order to turn those transistors on or off. In general, only one of the first series transistor 1010 or the second series transistor 1012 is turned on at a time, while the other is turned off. This arrangement causes the RF signal arriving at the Pin port 1002 to be transferred to only one of the first output port Out$_a$ 1004 or the second output port Out$_b$ 1006.

In addition to providing gate voltages to control the state of the first series transistor 1010 and the second series transistor 1012, the controller further provides control voltages to the switching elements of the first programmable limiter circuit 1020 and the second programmable limiter circuit 1022. In an operation that is similar to the controller 304 described above with regards to the example programmable limiter circuit 300, the controller 1008 selectably provides respective control voltages to the insulated gates of each switching element in each of the first programmable limiter circuit 1020 and the second programmable limiter circuit 1022. Each of these respective control voltages in an example are one of an on voltage or an off voltage, where the "off" voltage is able to be a negative voltage generated within the controller. In an example, a single voltage is used for the respective off voltage of each switching element.

In an example of the illustrated RF switch block with integrated GaN-based limiter circuit 1000, each transistor in a stack of GaN HEMT switching elements of the programmable limiter circuit connected to the series transistor that is "on" is biased with a gate voltage such that they each remain OFF when power is low. For example, when the first series transistor 1010 is biased to be "on," the insulated gates of each series connected FET of the first programmable limiter circuit 1020 is driven to be "off." In this example, once the input power being produced on the first output port Out$_a$ 1004 exceeds a certain threshold, the FETs biased to be "off" turn "on" because their $V_{gs}$ exceeds their pinch-off voltages. This causes the shunt connected first programmable limiter circuit 1020 to provide low impedance to ground that reflects most of the power back to the source of the power, i.e., to the Pin port 1002, and thus limits power delivered to the load.

In some examples, the controller 1008 operates in a manner similar to the operation of the controller 304 described above with regards to the example programmable limiter circuit 300. In some examples, the controller 1008 is able to have a threshold command input that is coupled to a data interface that receives data indicating a current threshold level for either one or both of the first programmable limiter circuit 1020 or the second programmable limiter circuit 1022. Based on a value of data contained in the received data, the controller 1008 is able to selectably provide respective control voltages to the insulated gates of each switching element in each of the first programmable limiter circuit 1020, the second programmable limiter circuit 1022, or both, to cause the indicated limiter threshold to be in effect for these limiter circuits.

Figure 11:
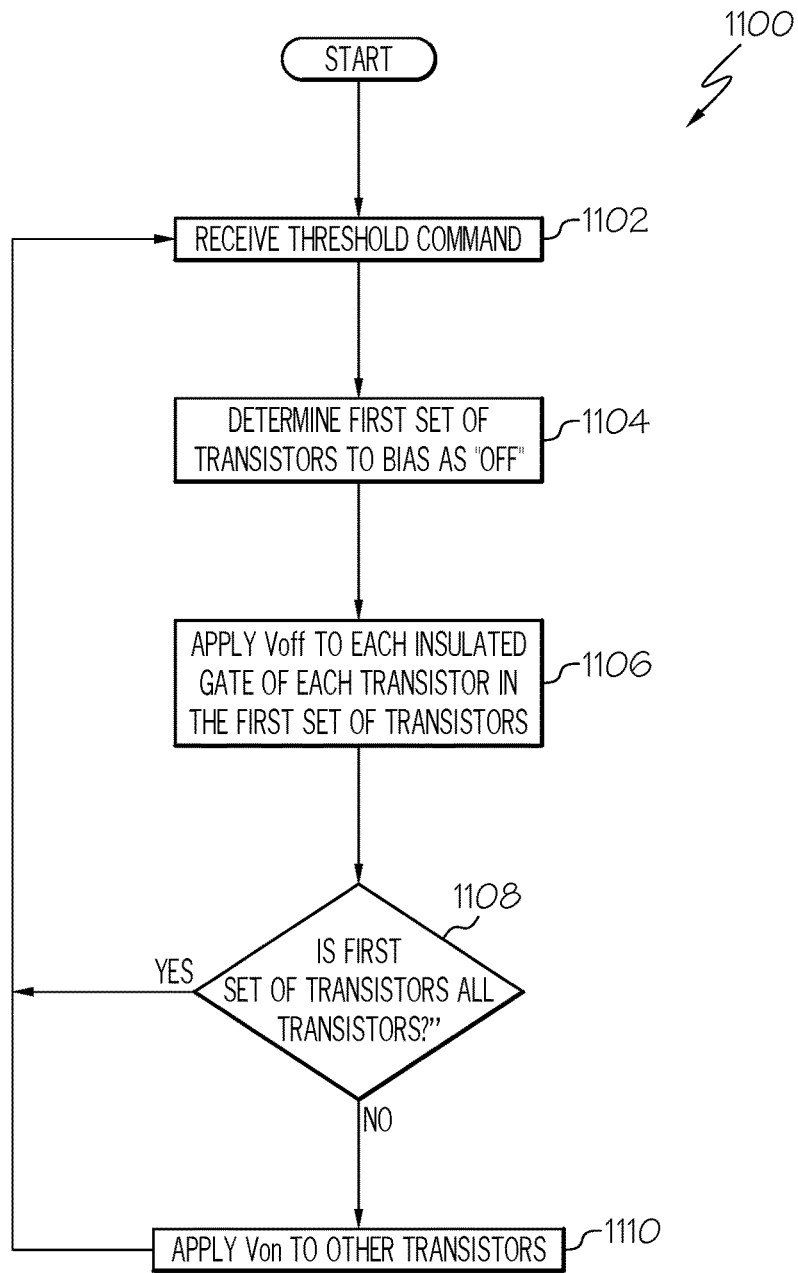
FIG. 11 illustrates a programmable limiter control process, according to an example.

FIG. 11 illustrates a programmable limiter control process 1100, according to an example. The following description of the programmable limiter control process 1100 refers to elements discussed with regards to the example programmable limiter circuit 300 discussed above. The programmable limiter control process 1100 is an example of a control process performed by the control interface 306 and the controller 304. In further examples, the programmable limiter control process 1100 is able to be performed by any suitable processor, circuit, other device, or combinations of these.

The programmable limiter control process 1100 beings by receiving, at 1102, a threshold command. In an example, the threshold command is a binary data value indicating the current threshold level to be implemented by a programmable limiter.

The programmable limiter control process 1100 determines, at 1104, a first set of transistors to bias as "off." This first set of transistors is selected from among the series connected shunt transistors discussed above. This determination is discussed above with regards to the threshold level command to transistor control relationship 400.

The programmable limiter control process 1100 applies, at 1106, $V_{off}$ to each insulated gate of each transistor in the first set of transistors.

The programmable limiter control process 1100 determines, at 1108, if the first set of transistors includes all of the transistors in the series connected shunt transistors. If the first set of transistors does not include all of the transistors, the programmable limiter control process 1100 applies $V_{off}$ to the insulated gates of the other transistors. After applying $V_{off}$ to the insulated gates of the other transistors, or if all transistors are determined to be in the first set, the programmable limiter control process 1100 returns to receive, at 1102, a threshold command.

The specification and figures are to be regarded in an illustrative rather than a restrictive sense, and all such modifications are intended to be included within the scope of the present invention. Any benefits, advantages or solutions to problems described herein with regard to specific embodiments are not intended to be construed as a critical, required or essential feature or element of any or all the claims. Unless stated otherwise, terms such as "first" and "second" are used to arbitrarily distinguish between the elements such terms describe.

Thus, these terms are not necessarily intended to indicate temporal or other prioritization of such elements. Note that the term "couple" has been used to denote that one or more additional elements may be interposed between two elements that are coupled.

Although the invention is described herein with reference to specific embodiments, various modifications and changes can be made without departing from the scope of the present invention as set forth in the claims below.

What is claimed is:

1. An adjustable threshold power limiter circuit, comprising:
  a plurality of switching elements including at least a first switching element and a second switching element, each respective switching element including:
  a respective first terminal, a respective second terminal, and a respective insulated gate terminal, and operable to form, based on a voltage between its insulated gate terminal and one of its first terminal and its second terminal exceeding a threshold, a respective conductive path between its first terminal and its second terminal;

a conductive path between a signal input and a reference potential, the conductive path including each switching element in the plurality of switching elements connected in a series arrangement between the signal input and the reference potential; and a controller electrically coupled to each respective insulated gate terminal of each switching element, the controller configured to:

receive a limiting threshold command, independently switch, based on the limiting threshold command, one of a respective on voltage and a respective off voltage to each respective insulated gate terminal, the respective on voltage causing its respective switching element to form a conductive path between its respective first terminal and its respective second terminal, and provide a single voltage as the respective off voltage to all switching elements, the single voltage being negative with regards to the reference potential, wherein the adjustable threshold power limiter circuit further comprises a voltage inverter circuit generating the single voltage.

2. The adjustable threshold power limiter circuit of claim 1, wherein the plurality of switching elements includes at least one intermediate switching element connected in series between the first switching element, the second switching element, and with one another.

3. The adjustable threshold power limiter circuit of claim 1, wherein the voltage inverter circuit includes a charge pump.

4. The adjustable threshold power limiter circuit of claim 3, the charge pump having a selectable number of stages that are selectable to set the off voltage.

5. The adjustable threshold power limiter circuit of claim 4, the adjustable threshold power limiter circuit further comprising:

a gate control voltage command input coupled to a data interface, wherein the controller:

receives, through the gate control voltage command input, a command indicating a voltage to be applied as the off voltage, and configures, based on the command indicating the voltage, a number of stages for the charge pump.

6. The adjustable threshold power limiter circuit of claim 1, further comprising a single integrated circuit comprising the controller and voltage inverter circuit.

7. The adjustable threshold power limiter circuit of claim 1, wherein each switching element in the plurality of switching elements includes a GaN HEMT.

8. An adjustable threshold power limiter circuit, comprising:

a plurality of switching elements including at least a first switching element and a second switching element, each respective switching element including:

a respective first terminal, a respective second terminal, and a respective insulated gate terminal, and operable to form, based on a voltage between its insulated gate terminal and one of its first terminal or its second terminal exceeding a threshold, a respective conductive path between its first terminal and its second terminal;

a conductive path between a signal input and a reference potential, the conductive path comprising each switching element in the plurality of switching elements connected in a series arrangement between the signal input and the reference potential; and a controller including a threshold command input coupled to a data interface, the controller electrically coupled to each respective insulated gate terminal of each switching element, the controller configured to:

receive a limiting threshold command, independently switch, based on the limiting threshold command, one of a respective on voltage and a respective off voltage to each respective insulated gate terminal, the respective on voltage causing its respective switching element to form a conductive path between its respective first terminal and its respective second terminal, and provide one of the respective off voltage and the respective on voltage to each switching element based on a value of data received on the data interface.

9. The adjustable threshold power limiter circuit of claim 8, the threshold command input receiving digital data indicating a threshold value, and wherein the controller includes a digital decoder with output lines including one respective output line for each switching element in the plurality of switching elements, the digital decoder provides the respective on voltage to a first set of output lines comprising a number of output lines corresponding to a value in the digital data, and the digital decoder provides the respective off voltage to output lines other than the first set of output lines.

10. The adjustable threshold power limiter circuit of claim 9, the controller providing a single negative voltage as the respective off voltage to all switching elements, and wherein the digital decoder includes:

a logic element converting the digital data to logic levels for each output line of the output lines, each output line switchable between a first logic level and a second logic level, and a negative level shifter configured to change the first logic level to the respective on voltage and change the second logic level to the respective off voltage.

11. The adjustable threshold power limiter circuit of claim 8, wherein each switching element in the plurality of switching elements includes a GaN HEMT.

12. A method, comprising:

receiving a threshold command;

determining, based on the threshold command, a first set of transistors within a plurality of transistors, the first set of transistors being selected to be biased in an off condition, and the plurality of transistors being connected in series with one another to form a shunt between a signal line and a reference potential;

applying an off voltage to gates of each transistor in the first set of transistors; and applying an on voltage to gates of each transistor in the plurality of transistors that are not in the first set, wherein the plurality of transistors includes GaN HEMT devices with insulated gate terminals, and wherein the off voltage is generated by a negative voltage inverting circuit.

13. The method of claim 12, wherein a single voltage is applied as the off voltage to all gates of each transistor in the first set of transistors.

14. The method of claim 12, further comprising:

receiving an off voltage command indicating a voltage value; and configuring, based on the off voltage command, a voltage generator to provide the voltage value as the off voltage to apply to gates of each transistor in the first set of transistors.

15. The method of claim 14, wherein the off voltage is a negative voltage, wherein the voltage generator includes a charge pump with a selectable number of stages, and wherein the configuring includes configuring the charge pump to use the selectable number of stages.

16. A combination signal switch and adjustable threshold power limiter circuit, comprising:
a first plurality of switching elements and a second plurality of switching elements, each of the first plurality of switching elements and the second plurality of switching element comprising at least a respective first switching element and a respective second switching element, each respective switching element in the first plurality of switching elements and the second plurality of switching elements comprising:
a respective first terminal, a respective second terminal, and a respective insulated gate terminal, and operable to form, based on a voltage between its insulated gate terminal and one of its first terminal or its second terminal exceeding a threshold, a respective conductive path between its first terminal and its second terminal;
a first series switching element coupling a signal input to a first signal output;
a first conductive path between the first signal output and a reference potential, the first conductive path comprising each switching element in the first plurality of switching elements connected in a series arrangement;
a second series switching element coupling the signal input to a second signal output;
a second conductive path between the second signal output and a reference potential, the second conductive path comprising each switching element in the second plurality of switching elements connected in a series arrangement; and
a controller electrically coupled to a gate of the first series switching element, a gate of the second series switching element, and respective insulated gate terminal of each switching element in the first plurality of switching elements and the second plurality of switching elements, the controller configured to selectably provide a respective control voltage to each respective insulated gate terminal, each respective control voltage provided to each respective insulated gate terminal being selectable independently of one another between either one of a respective on voltage and a respective off voltage.

17. The combination signal switch and adjustable threshold power limiter circuit of claim 16, the controller providing a single voltage as the respective off voltage to all switching elements.

18. The combination signal switch and adjustable threshold power limiter circuit of claim 16, the controller comprising:
a threshold command input coupled to a data interface,
where the controller provides one of the respective off voltage or the respective on voltage to each respective insulated gate terminal of at least one of the first plurality of switching elements or the second plurality of switching elements based on a value of data received on the data interface.

19. The combination signal switch and adjustable threshold power limiter circuit of claim 16, wherein each switching element in the first plurality of switching elements includes a GaN HEMT and each switching element in the second plurality of switching elements includes a GaN HEMT.

20. The combination signal switch and adjustable threshold power limiter circuit of claim 19, wherein the combination signal switch and the adjustable threshold power limiter circuit are completely contained within a single microelectronic package.

* * * * *